C. F. P. CARRIER.
AUTOMATIC ELECTRICAL CONTROLLING DEVICE.
APPLICATION FILED OCT. 9, 1919.
1,422,415.
Patented July 11, 1922.
2 SHEETS—SHEET 1.
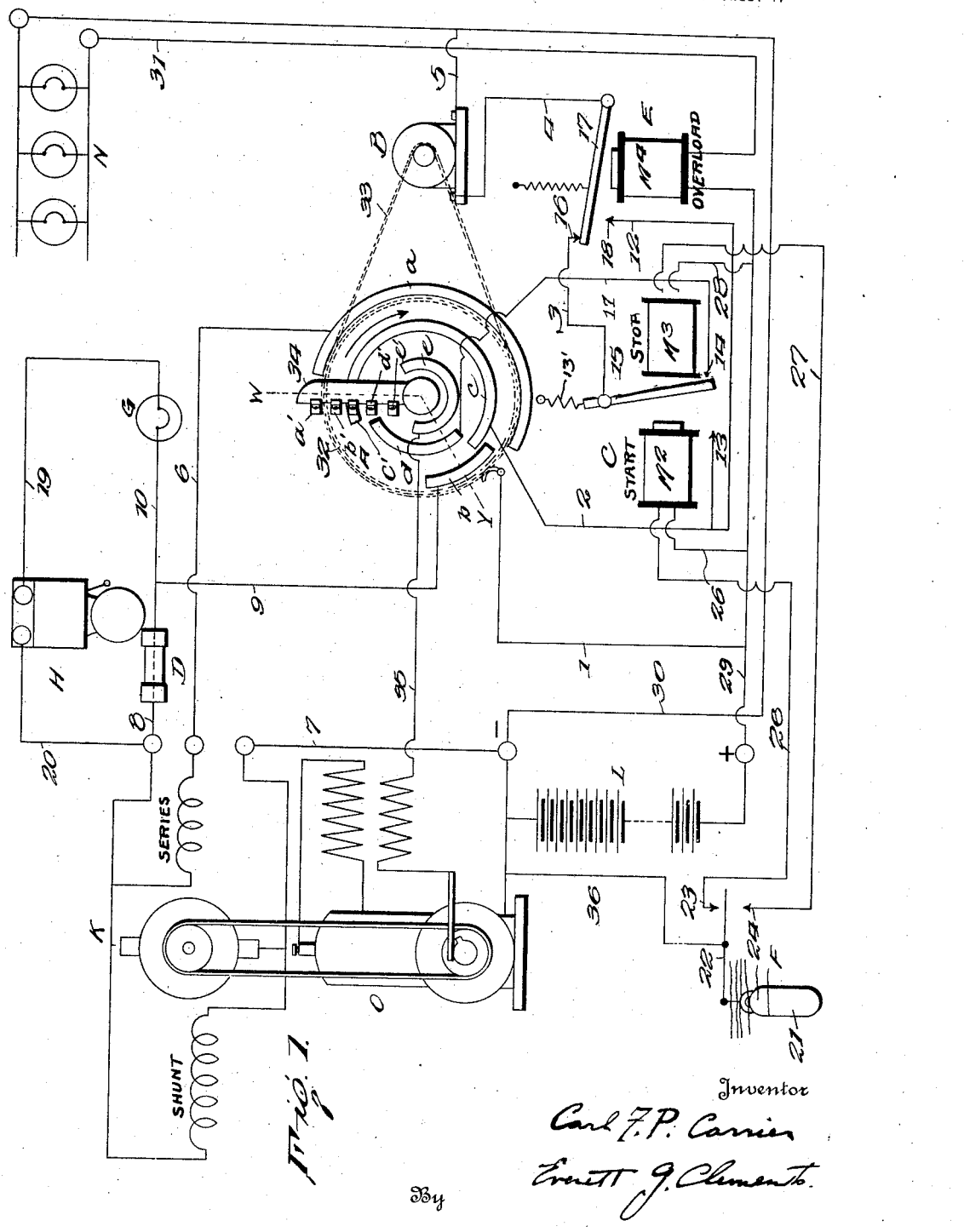
Inventor
Carl F. P. Carrier
Everett G. Clements
By
Attorney C. F. P. CARRIER.
AUTOMATIC ELECTRICAL CONTROLLING DEVICE.
APPLICATION FILED OCT. 9, 1919.
1,422,415.
Patented July 11, 1922.
2 SHEETS—SHEET 2.
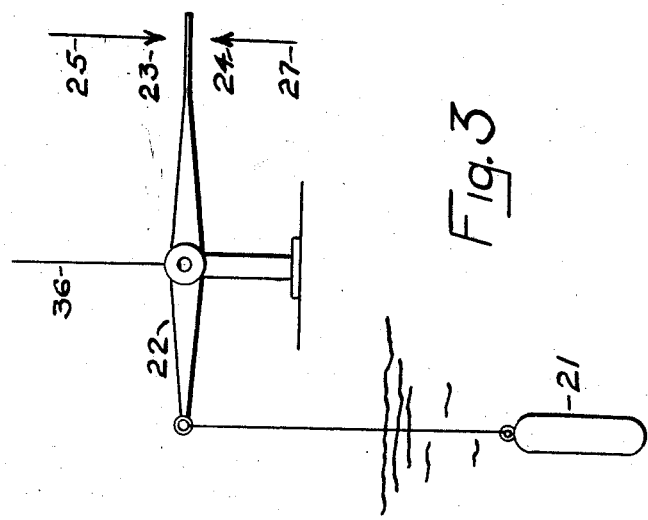
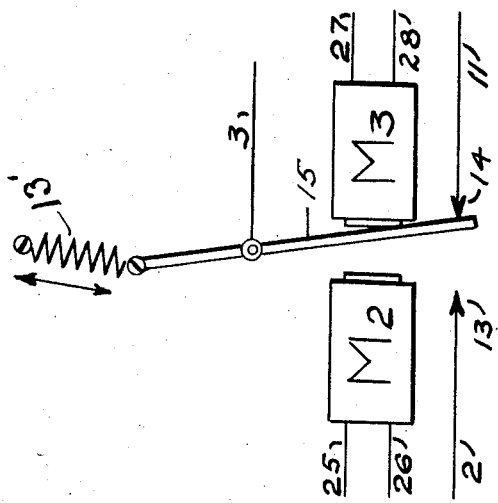
INVENTOR
Carl F. P. Carrier
ATTORNEY
Everett J. Clements

UNITED STATES PATENT OFFICE.

CARL F. P. CARRIER, OF PHILADELPHIA, PENNSYLVANIA.

AUTOMATIC ELECTRICAL CONTROLLING DEVICE.

1,422,415. Specification of Letters Patent. Patented July 11, 1922.

Application filed October 9, 1919. Serial No. 329,440.

*To all whom it may concern:*

Be it known that I, CARL F. P. CARRIER, a citizen of the United States, residing at Philadelphia, in the county of Philadelphia and State of Pennsylvania, have invented certain new and useful Improvements in Automatic Electrical Controlling Devices, of which the following is a specification.

The object of this invention is to provide an improved and simple automatic controlling device which will by its action start and stop other apparatus with which it may be used.

In the use of machinery for maintaining a constant condition without the use of manual adjustment it is necessary to interpose a self-acting device which will serve to restore the system to its normal condition, in the event of an abnormal change. Examples of these uses are various. In refrigerating machinery where it is sought to maintain a predetermined condition of temperature without the intervention of manual control it is possible to accomplish such results by the use of a device such as is hereinafter described and included as part of my invention. My invention is also applicable to the control of blowers, fans, or other ventilating devices to be set in motion or stopped by an abnormal or normal condition of temperature or other atmospheric factor. By the use of my invention it is further possible to control the draft of a blower or furnace of a heating system, dependent upon change from a predetermined temperature. Another application of this controlling switch is where the action of light may serve through a selenium cell or equivalently sensitive device to switch on and off lights or other signals.

In the control of electric apparatus, using heavy currents, the application of my device will provide for the control of the apparatus from a distance by means of light conduction.

A further object of my invention is to provide a form of signal operated by failure of the dynamo electric machine to notify the attendant of the need for adjustment or repair.

Other advantages will be manifest from the following description and drawings, in which—

Figure 1 shows a diagrammatic view of my controlling switch and the associated instruments.

Figure 2 shows a detailed view of the electrically operated relay, and

Figure 3 is a detail of the controlling element.

I have described my invention as applied to an isolated or independent power plant including a generator and a storage battery and in which control is obtained by means of a device responsive to the condition of said storage battery.

The switch is denoted generally by A and takes the form of an arm 34 and stationary co-operating segments, $a$, $b$, $c$, $d$, and $e$. Mounted on the arm 34 and co-operating with the segments are the corresponding brushes $a'$, $b'$, $c'$, $d'$, and $e'$. The arm and its brushes are electrically connected to a disk 32 and rotated in a clockwise direction by said disc which is operably connected by the endless belt 33 to the shaft of the electric motor B.

The conductor 1 leads from the positive pole of the storage battery L to a sliding contact on the disc 32. The negative pole of the battery is connected by conductor 7 to one side of the dynamo electric machine, denoted generally by K.

The various stationary segments on the switch are in contact with the brushes on the arm at the various positions of the latter. Current is led from segment $c$ by the lead 2 to contact points 13 and 18. Current from the segment $d$ passes to the contact point 14 oppositely disposed to the point 13. The points 13 and 14 form part of the electrically operated relay C. The movable armature 15 oscillates between contact points 13 and 14 and is held in position against one or the other of them by means of the expansion spring 13', as will be evident from Fig. 2. The movement of armature 15 is controlled by the electro-magnets $M^2$ and $M^3$. These magnets are actuated by a responsive device F indicated in detail in Fig. 3. This responsive device may consist of any element which will be set in movement or will otherwise respond to a change in condition of specific gravity, temperature, humidity, light, or the like. As illustrated, the responsive device F is shown as a hydrometer float 21, suspended in the electrolyte of the storage battery and sensitive to change in the specific gravity of the fluid. The float is suspended from one arm of the lever 22, the opposite arm making contact with the points 23 and 24 dependent upon the fall or rise of the float. The lever 22 is an electric conductor and connected by lead 26 to the negative pole of the storage battery. Lead 23 is connected to the coil of the magnet $M^2$, the opposite end of which coil connects with the positive pole of the storage battery. In like manner contact point 24 connects with one end of the coil of the magnet $M^3$. The other end of this coil connects with the positive pole of the storage battery.

In this manner a decrease in the specific gravity of the electrolyte permits the float 21 to fall and close the circuit through magnet $M^2$. The armature 15 is therefore attracted and comes in contact with contact 13. This completes the circuit from the battery through the rotary switch 34, segment c, lead 2, contact 13 and armature 15. From armature 15 current is drawn by conductor 3 to the contact point 16 against which a spring holds the armature 17 leading to one terminal 4 of the motor B. The motor is connected by means of lead 5 to the negative side of the storage battery L.

A shunt 12 from conductor 2 passes around the relay C and ends at the contact point 18, opposite contact point 16 and for a purpose to be hereinafter described.

The outermost segment a, of the stationary switch plate is connected to the series field of the motor generator K through lead 6. Lead 9 connects the small segment b with the conductor 10 which forms one end of the overload device D, shown in the preferred structure as a fuse. The opposite terminal of the fuse D is connected through lead 8 to the shunt field, armature and series winding of the dynamo electric machine. The lead 10 is branched to include a shunt containing a lamp signal G and a circuit containing, at a distant point, a signal H. This signal is shown as an electric bell. The circuit includes the return conductor 20 connected to the conductor 8.

The small segment d of the switch plate is in electric connection by means of conductor 11 with the contact point 14. By this means, as well as hereinafter described, current from the battery may pass from the switch 34 and segment d to the armature 15 in the event of the latter having been attracted to the magnet $M^3$.

The innermost segment e, on the switch plate, is in circuit with the ignition system of the internal combustion engine O. This engine operates with the dynamo electric machine K to which it is coupled.

The positive pole of the storage battery delivers power through the circuit indicated by the line 29, the electro-magnet $M^4$, the conductor 31 and external load N; returning by means of the conductor 30 to the negative pole of the storage battery. The negative pole of the storage battery is grounded to the engine frame. The action of the magnet $M^4$ is to become operative in case of an overload on the external circuit N. The magnet then draws down the armature 17 against the resistance of its spring and serves to break the circuit between the conductors 3 and 4 and close circuit through conductors 2, 12 and 4.

Assuming that the power plant is in a state of rest and that the battery has been depleted, the following operations ensue: The reduced specific gravity of the electrolyte will cause the float 21 to sink, thus closing the contact at 23. The magnet $M^2$ becomes operative by reason of the closing of the magnet circuit and serves to close armature 15 against contact 13. The arm 34 being in the vertical position shown in the diagram, permits the current from the positive pole of the storage battery to pass through disc 32, arm 34, contacts c, and c', conductors 2 and 13 to the armature 15, conductor 3 and contact 16. As the armature 17 is held in its upper position by means of the spring the current has a closed circuit through the motor B returning by 30 to the negative pole of the battery. The rotation of the shaft of the motor B is sufficient to give a slow clockwise rotation to the switch disc 32 and the arm 34. This will bring the brush a' in contact with segment a and close the circuit through the series field of the dynamo electric machine, the return being through the shunt field and armature via conductor 7 to the negative pole of the storage battery.

In this manner the dynamo electric machine operates as a compound motor utilizing the series field to give high starting torque to drive the crank-shaft of the gas engine O. Further rotation of the arm 34 brings the brush e' in contact with the segment e, thus closing the ignition circuit for the gas engine O. The latter, now operating as an independent power plant, in turn drives the dynamo electric machine K as a shunt wound generator and causes sufficient development of power to charge the storage battery. The charging circuit is by way of conductor 8, fuse D, conductors 9 and 10, segment b, brush b', and thence to the battery. The series field circuit has by this time become broken as brush a' has completely passed over segment a. The switch has now moved clockwise from position w—x to the position y—x. Since the arm 34 is no longer in contact with the segment c, the circuit to the motor B is broken and further rotation of the arm is stopped. The development of power, however, continues since the engine O is now driving the dynamo electric machine K and this energy is discharged through the overload device D to the segment b, thence to the positive pole of the storage battery, the return conductor 7 functioning as formerly. The arm 34 is now at rest in position y—x.

The charging current will never exceed the capacity of the dynamo electric machine K, hence the fuse D will have the same capacity. Should the gas engine fail to start when cranked, or should it stop for some reason, such as lack of fuel, break-down, or other cause, the dynamo electric machine K will then act as a short circuit across the battery. An excessive amount of current will flow across the short circuit and the fuse D will blow out under this condition. When the gap at D opens, the signal circuit with G and H will bear the full potential of the battery L. This brings into operation the signals G and H, and calls immediate attention to the abnormal condition of affairs.

In the event of the battery becoming fully charged as a result of the above charging operation the electrolyte of the battery increases in specific gravity and causes the float 21 to rise. This completes the circuit between 22 and 24 and causes the actuation of the magnet $M^3$. The armature 15 now swings toward magnet $M^3$ and closes the circuit between 14 and conductor 3. In this manner the battery current is now delivered to motor B and causes further rotation of the motor shaft. The switch 34 will therefore move from the position y—x to the position w—x in a clockwise direction. During this period of movement the contact between the brush e' and segment e is broken with the consequent stoppage of the engine O. At the end of this movement the brush d' passes out of contact with the segment d and breaks the circuit of the motor B. The arm 34 is therefore brought to a stop in a vertical position and is ready to repeat this cycle of operation when the battery becomes discharged.

The overload relay magnet $M^4$ will be energized in the event of too rapid discharge from the battery through the external circuit N. The armature 17 will fly toward the magnet $M^4$ against the force of the spring and will serve to break the motor circuit between 17 and contact point 16. The armature 17 is drawn far enough down to come in contact with the contact point 18 and thus completes the circuit to the motor B through the conductor 12. The motor rotates the arm 34 from the position w—x to the position y—x and causes the dynamo electric machine K to recharge the storage battery and also to support the overload of the external circuit as already described.

As soon as the overload ceases, the armature 17 flies back to its normal position making contact with contact point 16, which is already in complete circuit with the battery. This completes a circuit through motor B, and moves the arm 34 from position y—x to position w—x, bringing the engine to a stop.

It will be evident from the above description that a means is herewith provided for the automatic control and operation of an isolated or independent power plant without the need of manual adjustment. Such control is applicable to power plants for distribution of electricity, the actuation of refrigerating machinery or for the production of drafts by blowers and other ventilating devices.

It is to be understood that this invention can be used with responsive devices of various types such as thermostats, floats, or selenium cells. Provision is also made for giving a signal in case of failure of engine operation or where the circuit breaker responds to abnormal conditions in the electrical system.

What I claim as new and desire to secure by Letters Patent, is:

1. In a system for generating and distributing electricity, a dynamo electric machine having both shunt and series windings, a prime mover mechanically connected to said machine, a storage battery, a switching device, means responsive to the electrical condition of the battery for automatically operating said switching device, and means, controlled by said switching device, for either connecting the battery to said machine so as to utilize the shunt winding only, when the machine is acting as a generator, or for connecting said battery to the machine in such manner as to utilize the series winding when said machine is acting as a motor.

2. In an electrical generating and distributing system, a dynamo-electric machine, a prime-mover mechanically coupled thereto, a storage battery, a switching device for controlling the connections between said machine and battery, a pilot motor for operating said switching device, a relay for starting said pilot motor, a contact maker, and a circuit for said relay including said contact maker, but wholly independent of said switching device.

3. In an electrical generating and distributing system, a dynamo-electric machine, a prime-mover mechanically coupled thereto, a storage battery, a switching device for controlling the connections between said machine and battery, a pilot motor for operating said switching device, a relay for closing the circuit of said pilot motor, said switching device being also arranged to control said circuit, and means for maintaining the circuit of the pilot motor closed through said relay contacts until opened by said switching device.

4. In a system for generating and distributing electricity, the combination with a dynamo electric machine, and a prime-mover mechanically coupled thereto, of a storage battery, a switching device for either causing said battery to be charged by said machine when acting as a generator or for causing said battery to supply current to said machine and drive it as a motor, a pilot motor for operating said switching device, a relay for starting said pilot motor, a contact maker, a circuit for said relay including said contact maker but wholly independent of said switching device, and an electrically actuated signal for indicating an excessive flow of current through said machine in either direction.

In testimony whereof I affix my signature.

CARL F. P. CARRIER.